US012750409B2

(12) United States Patent
Tang et al.

(10) Patent No.: US 12,750,409 B2
(45) Date of Patent: Sep. 29, 2026

(54) SIMULATED CHORAL AUDIO CHATTER

(71) Applicant: Microsoft Technology Licensing, LLC, Redmond, WA (US)

(72) Inventors: John C. Tang, Palo Alto, CA (US); William Arthur Stewart Buxton, Toronto (CA); Edward Sean Lloyd Rintel, Cambridge (GB); Amos Miller, Seattle, WA (US); Andrew D. Wilson, Seattle, WA (US); Sasa Junuzovic, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 17/938,889

(22) Filed: Oct. 7, 2022

(65) Prior Publication Data

US 2024/0121280 A1 Apr. 11, 2024

(51) Int. Cl.

*H04L 65/401* (2022.01)
*G10L 21/007* (2013.01)
*G10L 25/48* (2013.01)

(52) U.S. Cl.

CPC ........ *H04L 65/4015* (2013.01); *G10L 21/007* (2013.01); *G10L 25/48* (2013.01)

(58) Field of Classification Search

CPC ..... H04L 65/00; H04L 65/4015; G10L 21/00; G10L 21/007; G10L 25/00; G10L 25/48

See application file for complete search history.

(56) References Cited

U.S. PATENT DOCUMENTS

| | | | | |
|---|---|---|---|---|
| 10,491,579 B2 | 11/2019 | Yoakum | | |
| 10,536,288 B1 | 1/2020 | Leblang | | |
| 11,107,490 B1 | 8/2021 | Slotznick | | |
| 11,343,293 B1 | 5/2022 | Slotznick | | |
| 11,362,848 B1 | 6/2022 | Lin | | |
| 2004/0019479 A1* | 1/2004 | Hillis | ..................... | H04K 3/825 704/E21.001 |
| 2009/0006082 A1* | 1/2009 | Harris | .................... | G11B 27/28 707/999.005 |
| 2011/0069643 A1 | 3/2011 | Yoakum | | |

(Continued)

FOREIGN PATENT DOCUMENTS

| | | |
|---|---|---|
| WO | 2021119090 A1 | 6/2021 |
| WO | WO-2023049483 A1 * | 3/2023 |

OTHER PUBLICATIONS

International Search Report and Written Opinion received for PCT Application No. PCT/US23/032568, mailed on Dec. 4, 2023, 16 Pages.

(Continued)

*Primary Examiner* — Sean E Serraguard
(74) *Attorney, Agent, or Firm* — Alleman Hall LLP

(57) ABSTRACT

Systems, methods, and computer-readable storage devices are disclosed for simulated choral audio chatter in communication systems. One method including: receiving audio data from each of a plurality of users participating in a first group of a plurality of groups for an event using a communication system; generating first simulated choral audio chatter based on the audio data received from each of the plurality of users in the first group; and providing the generated first simulated choral audio data to at least one user of a plurality of users of the event.

20 Claims, 5 Drawing Sheets

(56) References Cited

U.S. PATENT DOCUMENTS

| | | | | |
|---|---|---|---|---|
| 2011/0267419 | A1* | 11/2011 | Quinn | G06F 3/04842 348/E7.083 |
| 2016/0364397 | A1* | 12/2016 | Lindner | H04L 65/764 |
| 2021/0176429 | A1* | 6/2021 | Peters | G06V 20/41 |
| 2022/0021845 | A1 | 1/2022 | Schneider | |
| 2022/0086203 | A1 | 3/2022 | Morris et al. | |
| 2022/0103963 | A1 | 3/2022 | Satongar et al. | |
| 2022/0254368 | A1* | 8/2022 | Waine | G10L 15/18 |
| 2022/0321373 | A1* | 10/2022 | Lin | H04L 12/1822 |
| 2022/0383849 | A1* | 12/2022 | Benedetto | A63F 13/54 |
| 2023/0007063 | A1* | 1/2023 | Gupta | H04L 65/1069 |
| 2023/0032041 | A1* | 2/2023 | Ittelson | H04L 65/403 |
| 2023/0360315 | A1* | 11/2023 | Morris | H04S 7/302 |

OTHER PUBLICATIONS

"Spatial Audio Falloff", Retrieved from: https://support.spatial.io/hc/en-us/articles/360057390071-Spatial-Audio-Falloff, Feb. 26, 2022, 3 Pages.

Nopanen, Vesa, "Collaboration in the Metaverse: Mesh for Microsoft Teams", Retrieved from: https://mymetaverseday.com/2021/11/17/mesh/, Nov. 17, 2021, 12 Pages.

Wong, et al., "Shared-Space: Spatial Audio and Video Layouts for Videoconferencing in a Virtual Room", In Proceedings of Immersive and 3D Audio: from Architecture to Automotive, Sep. 8, 2021, 6 pages.

International Preliminary Report on Patentability received for PCT Application No. PCT/US23/032568, mailed on Apr. 17, 2025, 10 Pages.

* cited by examiner

SIMULATED CHORAL AUDIO CHATTER

TECHNICAL FIELD

The present disclosure relates to communication systems that provide, among other things, audio and/or video, that provide feedback, including audio feedback, laughter, applause, or other aggregated feedback, for groups, such as conferences that have breakout rooms. Specifically, the present disclosure relates to communication system providing simulated choral audio chatter in conferencing breakout applications.

INTRODUCTION

Communication systems may allow a plurality of users to interact and/or collaborate during a meeting. For example, some communication systems allow people to collaborate using live video streams, live audio streams, and/or other forms of text-based or image-based mediums. Users of a communication session of the communication system may share a video stream and/or audio streams that are provided to the plurality of users.

During meetings, an administrator or moderator, to curate a communication session of the communication system, may dynamically create additional groups to form a network of groups to an event or conference. These additional groups may be a number of side meetings and breakout sessions.

The capability to easily create breakout rooms and the ability to assign individuals to breakout rooms provides a seamless experience in joining into breakout rooms. The administrator or moderator may bring back breakout room users to the main room. However, while users are in the side meetings and/or breakout rooms, the administrator or moderator may have limited feedback from the side meetings, breakout meetings, and/or users. Moreover, noise suppression components used by the communication system may suppress audio feedback for the administrator, moderator, and/or users.

These shortcomings lead to less than optimal interactions between the administrator or moderator and the users. In addition, such shortcomings of existing communication systems can lead to a loss in user engagement. Loss of user engagement can lead to production loss and inefficiencies with respect to a number computing resources. For instance, when a user becomes fatigued or disengaged, that user may need to refer to recordings or other resources. Missed content may need to be re-sent when viewers miss salient points or cues during a live meeting. Viewers may also have to re-watch content when they miss salient points or non-verbal social cues during a viewing of a recorded presentation. Such activities can lead to inefficient use of a human resources, network, processor, memory, or other computing resources. Thus, there is an ongoing need to develop improvements to help make the user experience more like an in-person meeting and more engaging.

SUMMARY OF THE DISCLOSURE

According to certain embodiments, systems, methods, and computer-readable media are disclosed for simulated choral audio chatter.

According to certain embodiments, a computer-implemented method for simulated choral audio chatter in communication systems is disclosed. One method comprising: receiving audio data from each of a plurality of users participating in a first group of a plurality of groups for an event using a communication system; generating first simulated choral audio chatter based on the audio data received from each of the plurality of users in the first group; and providing the generated first simulated choral audio data to at least one user of a plurality of users of the event.

According to certain embodiments, a system for simulated choral audio chatter in communication systems is disclosed. One system including: a data storage device that stores instructions to generate simulated choral audio chatter in communication systems; and a processor configured to execute the instructions to perform a method including: receiving audio data from each of a plurality of users participating in a first group of a plurality of groups for an event using a communication system; generating first simulated choral audio chatter based on the audio data received from each of the plurality of users in the first group; and providing the generated first simulated choral audio data to at least one user of a plurality of users of the event.

According to certain embodiments, a computer-readable storage device storing instructions that, when executed by a computer, cause the computer to perform a method for simulated choral audio chatter in communication systems is disclosed. One method of the computer-readable storage device including: receiving audio data from each of a plurality of users participating in a first group of a plurality of groups for an event using a communication system; generating first simulated choral audio chatter based on the audio data received from each of the plurality of users in the first group; and providing the generated first simulated choral audio data to at least one user of a plurality of users of the event.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
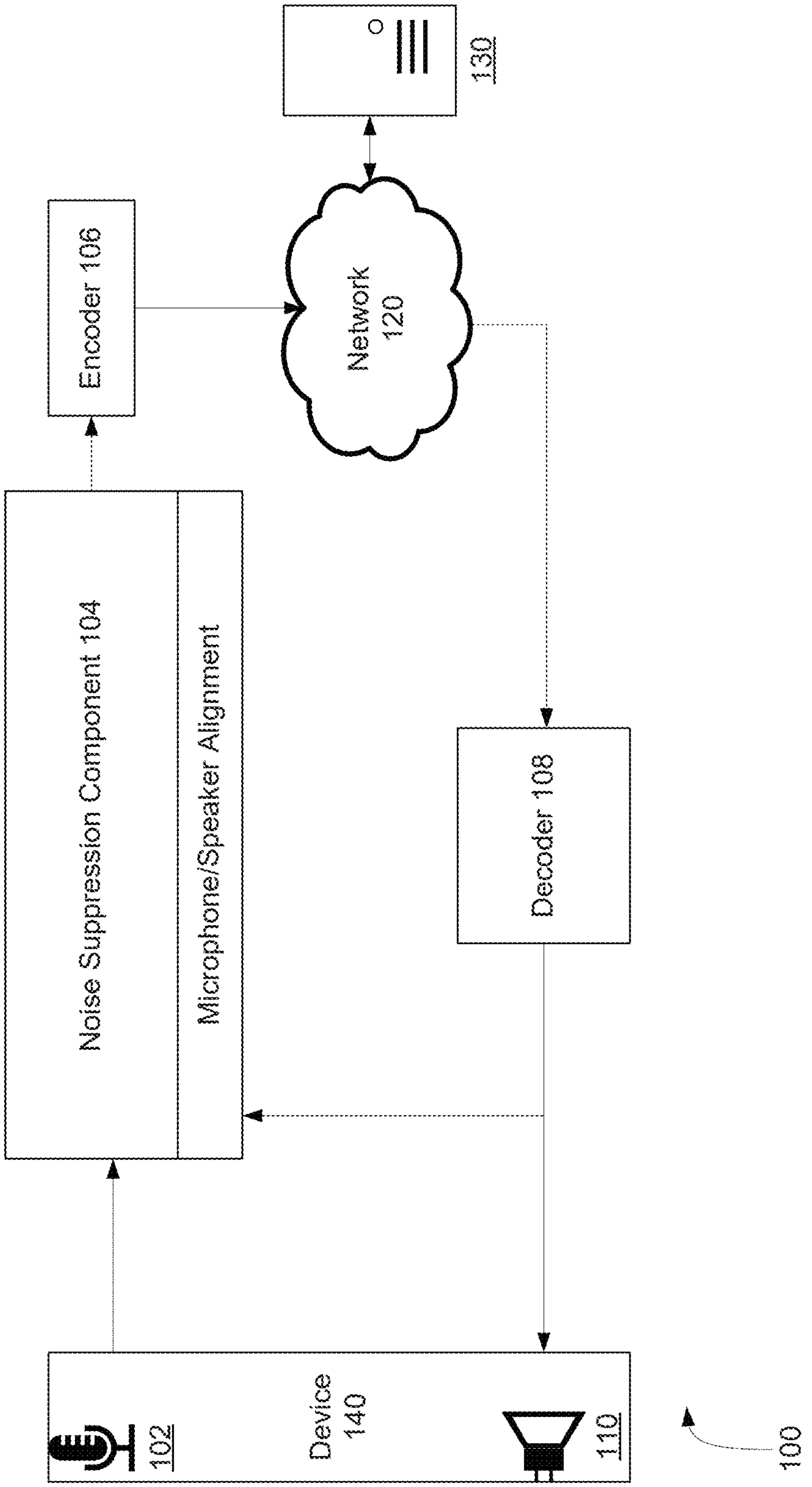
FIG. 1 depicts an exemplary architecture of a speech communication system pipeline for devices connected to groups, conference rooms, and/or breakout rooms, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to generate simulated choral audio chatter in communication systems to provide feedback to an administrator of an event, a moderator of the event, an overseeing user of the event, and/or a plurality of users attending the event. The event may be of any size and may include a conference, an exhibition hall, a school, and or other large events in which users are divided into groups or clusters, such as breakout rooms, classrooms, lectures, side meetings, etc. in which communication systems are used to facilitate virtual attendance to the event.

Embodiments of the present disclosure provide an approach which may be used to enhance the experiences of users, administrators, moderators, and/or overseers that are using the communication system to attend/participate in the event. In particular, embodiments of the present disclosure may monitor groups activities of an event, such as a conference using a communication system, and may produce spatial audio signal representative of choral activity of the group to be conveyed to others who may be listening at a distance (virtual distance) or in another channel. For example, when a breakout room is created, instead of a presenter being left in silence, the presenter may hear choral audio cues from each sub-channel breakout. The audio may be a generated simulation reflecting a quantity of chatter, the audio may be an actual pass-through of the audio communication, and/or a blended mix of the two based on privacy or desired mixing ratios. Such an approach may provide for a better group/breakout room experience. Moreover, audio may be provided to the groups/breakout rooms that allow other groups/breakout rooms to hear each other, for example at given distance from each other.

As non-limiting examples, the simulated choral audio chatter may include at least one or more of the following: the audio may be an unfiltered pass-through of users' talk, the audio may be a filtered version of the users' talk (using a frequency, volume, and/or other audio filter), the audio may be a sound/set of sounds that represents at least one or more measured features of users' talk (such as, e.g., pace, tone, volume, quantity, etc.), the audio may be a sound/set of sounds that represents a measured quantity of users' other communicative activity derived from video data, text data, gesture data, and/or transcription of the audio data. Furthermore, embodiments of the present disclosure may not be limited to be spatial audio. A stereo or mono signal may be used to provide feedback. Additionally, a non-audio signal, such as, e.g., a visual representation or text.

Thus, embodiments of the present disclosure provide feedback to presenters, speakers, moderators, administrators, overseeing users, and/or users where many users are conferencing together instead of the uncomfortable silence that surrounds conferencing when breakouts are performed. Moreover, because noise suppression components used by the communication system may suppress audio feedback for the administrator, moderator, and/or users, embodiments of the present disclosure improve experiences of the event by adding simulated chatter that might be inadvertently lost due to noise suppression or from the event been remote/virtual in nature. The simulated chatter may be generated from audio data of groups and may represent the volume and energy of the conversation of the group, but may be filtered (muffled) to preserve privacy of speech of the audio data. For example, the muffled chatter may sound vocal but unintelligible and/or may should like a trombone with a mute in the bell, as adults sound in Peanuts cartoons by Charles M. Schulz. Additionally, the simulated chatter may also include applause, laughter, and/or other aggregated feedback.

FIG. 1 depicts an exemplary architecture of a speech communication system pipeline for devices connected to groups, conference rooms, and/or breakout rooms, according to embodiments of the present disclosure. Specifically, FIG. 1 depicts speech communication system pipeline having a plurality of at least one speech enhancement component, such as noise suppression, that may cause an event to lose audio feedback. As shown in FIG. 1, a microphone 102 of a device 140 may capture audio data including, among other things, speech of a user of a communication system 100. The audio data captured by microphone 102 may be processed by one or more speech enhancement components of the communication system 100. Non-limiting examples of speech enhancement components include music detection, acoustic echo cancelation, noise suppression, dereverberation, echo detection, automatic gain control, voice activity detection, jitter buffer management, packet loss concealment, etc.

FIG. 1 depicts the audio data being received by a noise suppression component 104 that may suppress noise in the audio data. In addition to the receiving audio data captured by microphone 102, the noise suppression component 104 may receive speaker data played by speaker 110 to provide microphone and speaker alignment, such as microphone 102 and speaker 110 of device 140. Noise suppression component 104 may process the audio data and speaker data to isolate speech from other sounds and music during playback. For example, when microphone 102 is turned on, background noise around the user such as shuffling papers, slamming doors, barking dogs, etc. may distract other users. Noise suppression component 104 may remove such noises around the user in communication systems.

The audio data, after being processed by one or more speech enhancement components, such as noise suppression component 104, may be speech enhanced audio data, and further processed by one or more other speech enhancement components. The audio data may then be received by encoder 106. Encoder 106 may be an audio codec, such as an AI-powered audio codec, e.g., SATIN encoder, which is a digital signal processor with machine learning. Encoder 106 may encode (i.e., compress) the audio data for transmission over network 120. Upon encoding, encoder 106 may transmit the encoded audio data to the network 120 where other components, such as the communications server 130, of the communication system are provided. The other components of the speech communication system speech may then transmit over network 120 audio data of the user and/or other users of the communication system.

A decoder 108 may receive the audio data that is transmitted over network 120 and process the audio data. Decoder 108 may be an audio codec, such as an AI-powered audio codec, e.g., SATIN decoder, which is a digital signal processor with machine learning. Decoder 108 may decode (i.e., decompress) the audio data received from over the network 120. Upon decoding, decoder 108 may provide the decoded audio data to speaker 110. Speaker 110 may play the decoded audio data as speaker data. The speaker data may also be provided to noise suppression component 104. Device 140 may include one or both of microphone 102 and/or speaker 110, for example, device 140 may be, among other things, a combined microphone and speaker such a headset, handset, conference call device, smart speaker, etc., and/or device 140 may be a microphone separate and distinct from a speaker. Alternatively, components of the communication system 100 may reside over the network 120 and/or in a cloud, and communicate over the network to one or more of the devices 140.

Figure 2:
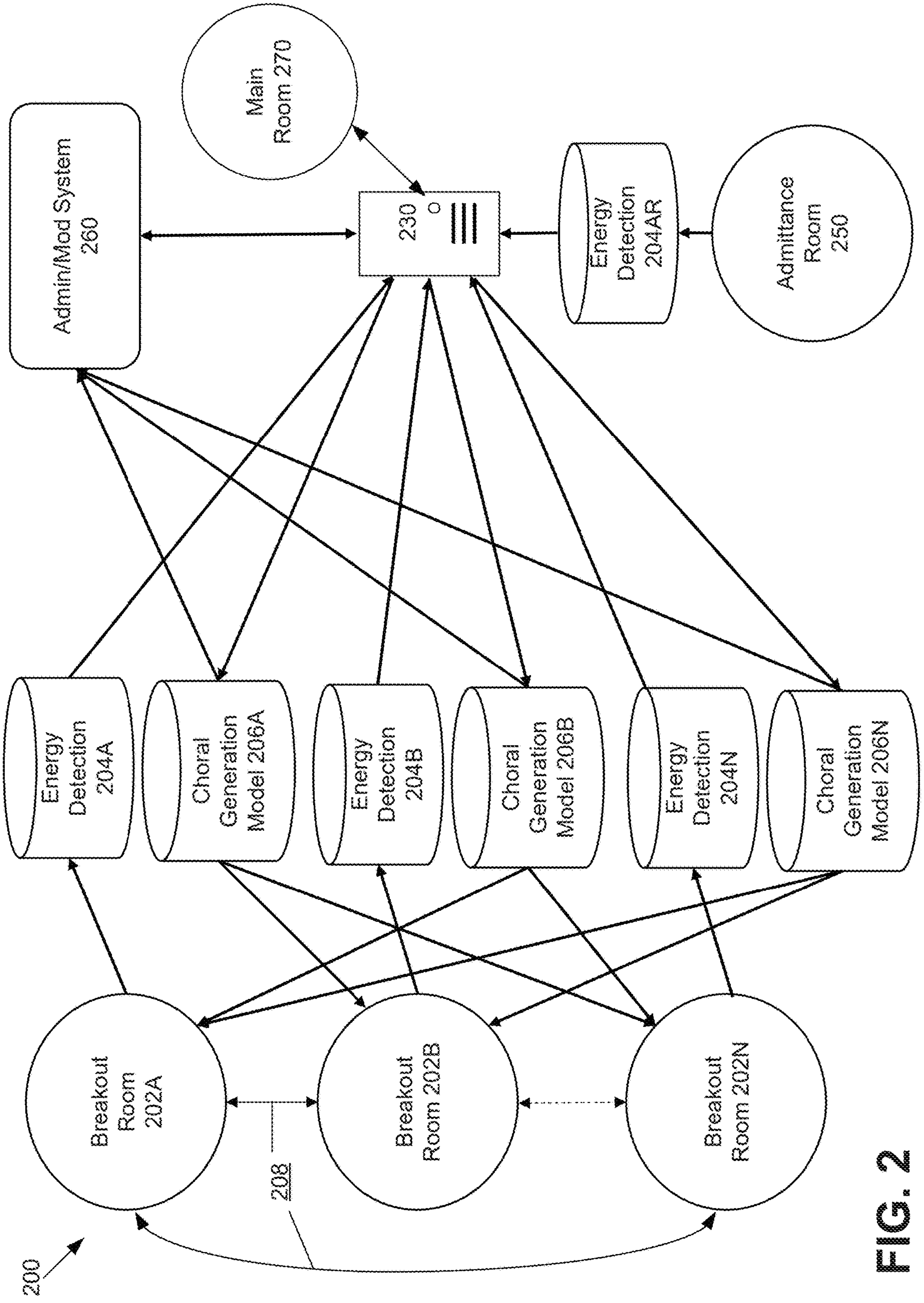
FIG. 2 depicts an exemplary architecture of one or more devices participating in a group and/or breakout room of an event or conference using a communication system, according to embodiments of the present disclosure.

FIG. 2 depicts an exemplary architecture 200 of one or more devices, such as devices 140, participating in a group and/or breakout room of an event or conference using a communication system, according to embodiments of the present disclosure. For example, a plurality of users using associate devices, such as devices 140, may connect over a network, such a network 120, to a communication system hosted by, for example, a conferencing server 230. The conferencing server 230 may host the event, receive audio data, create and/or manage a main room 270 for the event, create and/or manage groups, admit users to the event and/or groups, detect energy of a group, and/or generate simulated choral audio chatter, etc. As mentioned above, the event may be one or more of a conference, an exhibition hall, a school, other large event, etc., and the groups may be breakout rooms, classrooms, lectures, side meetings, etc.

As shown in FIG. 2, the conferencing server 230 may create and/or manage a plurality of groups, such as breakout rooms 202A, 202B, . . . 202N, where N is an integer. Each breakout room may include a plurality of users providing audio data to and/receiving audio data from the conferencing server 230. The conferencing server 230 may provide the audio data of each of the users in the breakout room to the other users in the same breakout room. The conferencing server 230 may also connect to at least one user including one or more of an administrator of the event, a moderator of the event, and an overseeing user of the event through, for example, admin/mod system 260. The administrator of the event, the moderator of the event, and/or the overseeing user of the event may moderate the event from a main room 270 of the event and/or may moderate the event from one or more of the breakout rooms 202A, 202B, . . . 202N. Further, the conferencing server 230 may create and/or manage an admittance room 250 for the event. The admittance room 250 may be an entry point to the main room 270 and/or a breakout room 202A, 202B, . . . 202N. For example, the administrator of the event, the moderator of the event, and/or the overseeing user of the event may admit one or more users waiting in the admittance room 250 into the main room 270 and/or a breakout room 202A, 202B, . . . 202N. The admittance room, similar to each group/breakout room, may include a plurality of users providing audio data to and/receiving audio data from the conferencing server 230, the conferencing server 230 may provide the audio data to the administrator of the event, the moderator of the event, and/or the overseeing user of the event and/or may provide the audio data to the main room 270. Additionally, and/or alternatively, as users of the plurality of user re-join the main room 270 from the breakout room 202A, 202B, . . . 202N, generated simulated choral audio chatter for the main room 270 may be provided to the one or more breakout rooms 202A, 202B, . . . 202N so that user remaining in their respective breakout rooms know that it is time to re-join the main room 270.

Each breakout room 202A-202N may also include a spatial location associated with the group. Based on the spatial locations of each breakout room 202A-202N, distances 208 may be determined between each of the breakout rooms 202A-202N. While breakout rooms 202A-202N are shown as being in a line, any spatial topography is possible, such as a circle, sphere, etc. Moreover, each breakout room 202A-202N may initially be equally distanced from one another, and their spatial locations may be adjusted based on one or more factors. Moreover, each admin/mod system 260 may include a spatial location associated with a respective administrator, moderator, overseeing user, presenter, etc. Based on the spatial locations of each admin/mod system 260, distances may be determined between each of the breakout rooms 202A-202N and each admin/mod system 260.

Each breakout room 202A-202N may have an associated energy detection module 204A, 204B, . . . 204N, and admittance room 250 may have an associated energy detection module 204AR. Each of the energy detection modules 204 may detect an energy of the respective breakout room 202. For example, energy detection modules 204 may determine an amount of speech in the respective breakout room 202 based on the audio data received from each of the plurality of users in the respective breakout room 202. Additionally, and/or alternatively, energy detection modules 204 may determine an activity level in the respective breakout room 202 based on the audio data received from each of the plurality of users in the respective breakout room 202. The activity level may also be determined based on one or more of video data, text data, gesture data, and transcription of the audio data from each of the plurality of users in the respective breakout room 202. Additionally, and/or alternatively, energy detection modules 204 may analyze the audio data of each breakout room 202 for a keyword and/or phrase. Then, energy detection modules 204 may determine whether the keyword or phrase has occurred in the audio data of each breakout room 202, and the spatial location of each breakout room 202 may be adjusted when the keyword or phrase is determined to have occurred in the audio data of the breakout room 202. For example, if a particular name is spoken in a particular breakout room, the spatial location of the particular breakout room may be adjusted to decrease the distance of the particular breakout room and another breakout room and/or the admin/mod system 260.

Additionally, and/or alternatively, energy detection modules 204 may determine an amount of speech in each breakout room 202 based on the audio data received from each of the plurality of users in the respective breakout group 202. Then, energy detection modules 204 may generate and send a signal to one or more of the administrators of the event, the moderator of the event, and the overseeing user of the event using admin/mod system 260 when the determined amount of speech is below a predetermined threshold. Thus, the administrator of the event, the moderator of the event, and the overseeing user may determine whether to end the breakout sessions, enter the breakout room, and/or send information to the plurality of users in the respective breakout group 202 to induce collaboration and/or interaction.

Additionally, each breakout room 202A-202N may have an associated choral generation model module 206A, 206B, . . . 206N. Admittance room 250 may also have an associated choral generation model module (not shown). Each of the choral generation model module 206 may generate simulated choral audio chatter for a respective breakout room 202, and provide the respective generated simulated choral audio chatter to at least one user not in that respective breakout room and/or to each admin/mod system 260. The generated simulated choral audio chatter may be based on the audio data received from each of the plurality of users in the respective breakout room 202 and/or based on the detected energy by the respective energy detection module 204 of the respective breakout room 202, such as based on the determined activity level of the breakout room 202 and/or the amount of speech in the breakout room 202.

For example, each of the choral generation model module 206 may generate simulated choral audio chatter based on i) actual audio captured by microphones of users in the respective breakout room 202, ii) derivative data that is derived from the audio, or iii) a blend of the actual audio data and derivative data. Depending on the configuration of the system, the generated simulated choral audio chatter may remove recognizable speech of the audio data, and the generated simulated choral audio chatter may be muffled to preserve privacy of the speech of the audio data. Additionally, and/or alternatively, the generated simulated choral audio chatter may correspond to a pace, a tone, a volume, and a frequency of the audio data received from each of the plurality of users in the breakout room, but otherwise not be recognizable speech. In other words, the generated simulated choral audio chatter may sound vocal but unintelligible and/or may sound like a trombone with a mute in the bell, as the adults sound in the Peanuts cartoons by Charles M. Schulz. Moreover, the simulated choral audio may also be generated by applying some filters, e.g. muffling, which may be a modified version of the original audio data, and/or may be transformed into some other audio data, such as, e.g., the Charlie Brown trombone sound.

For example, choral generation model module 206A may receive audio data from each of a plurality of users participating in a breakout room 202A, and may generate simulated choral audio chatter based on the audio data received from each of the plurality of users in the breakout room 202A. Then, the generated simulated choral audio data may be provided to at least one user of a plurality of users of the event, such as users in another breakout room, such as breakout rooms 202B-202N, and/or the administrator of the event, the moderator of the event, the overseeing user of the event, a presenter at the event, etc. Concurrently, and/or consecutively, choral generation model module 206B may receive audio data from each of a plurality of users participating in a breakout room 202B, and may generate simulated choral audio chatter based on the audio data received from each of the plurality of users in the breakout room 202B. Then, the generated simulated choral audio data may be provided to at least one user of a plurality of users of the event, such as users in another breakout room, such as breakout rooms 202A and 202C-202N, and/or the administrator of the event, the moderator of the event, the overseeing user of the event, a presenter at the event, etc. As mentioned above, the conferencing server 230 may manage an admittance room 250 for the event. Admittance room 250 may have an associated energy detection module 204AR that may detect an energy of the admittance room 250. Based on the detected energy of the admittance room 250, a respective administrator, moderator, overseeing user, presenter, etc. of the admin/mod system 260 may admit one or more users waiting in the admittance room 250 to the event and/or to at least one of the breakout rooms 202. Admittance room 250 may also have an associated choral generation model module (not shown) that generates admittance simulated choral audio chatter based on the audio data received from each of the plurality of users in the admittance room 250. The generated admittance simulated choral audio data may be provided to the administrator of the event, the moderator of the event, and the overseeing user of the event. Thus, the administrator of the event, the moderator of the event, and the overseeing user may become aware of users desiring to join the event and/or main room 270, and may act accordingly.

Further, as mentioned above, distances 208 may be determined between each of the breakout rooms 202A-202N based on the spatial locations of each breakout room 202A-202N. Choral generation model modules 206 may generate simulated choral audio chatter based on the audio data received from each of the plurality of users in respective breakout rooms 202 and based on the corresponding distances 208. For example, the generated simulated choral audio data may be provided to a particular breakout room of the plurality of the breakout rooms 202 when the determined distance for the particular breakout room is less than a first predetermined threshold or less than and equal to the first predetermined threshold. Otherwise, the generated simulated choral audio data will not be provided to the particular breakout group when the distances is greater than or equal to or greater than the first predetermined threshold. Alternatively, choral generation model modules 206 may only generate simulated choral audio chatter when the determined distance for the particular breakout room is less than a first predetermined threshold or less than and equal to the first predetermined threshold.

Additionally, choral generation model modules 206 may generate simulated choral audio chatter based on the audio data received from each of the plurality of users in respective breakout rooms 202 and based on the corresponding distances 208. For example, choral generation model modules 206 may adjust the generated simulated choral audio data for each breakout room based on the determined distance between each breakout room. Thus, as the determined distance increases, a volume of the generated simulated choral audio data may decrease.

Moreover, when the determined distance for the particular breakout room is less than a second predetermined threshold or less than and equal to the second predetermined threshold, choral generation model modules 206 may determine that breakout rooms 202 are so close that simulated choral audio is to no longer be provided, and rather the audio data of breakout rooms 202 that are a distance that is less than or less than or equal to the second predetermined threshold may be provided to the respective breakout rooms. When such a condition occurs, one or more of an administrator of the event, a moderator of the event, an overseeing user of the event, and users of the particular group when audio data of the particular breakout rooms may be provided an alert that their audio is being provided to at least one other user.

Figure 3:
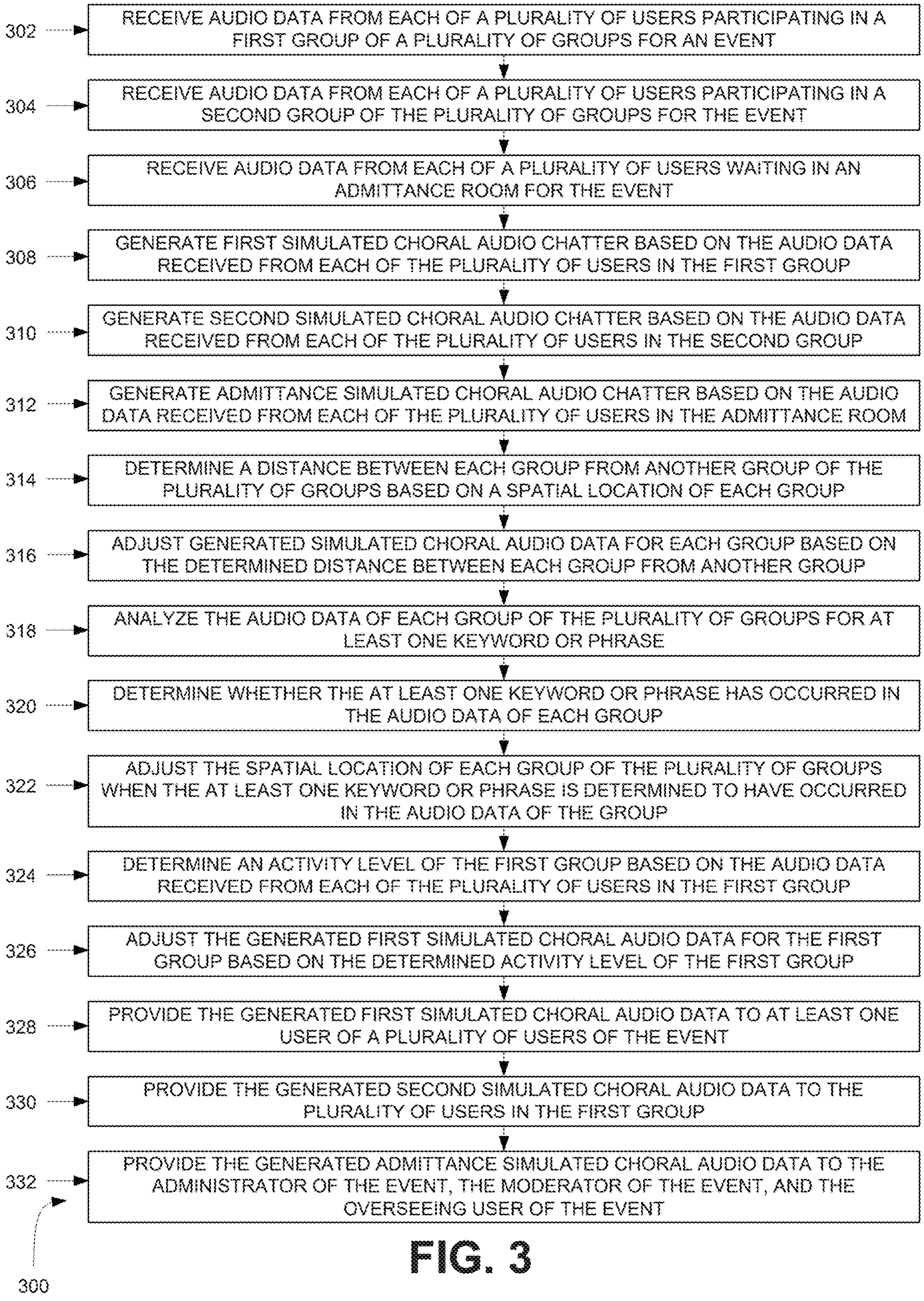
FIG. 3 depicts a method for simulated choral audio chatter in communication systems, according to embodiments of the present disclosure.

FIG. 3 depicts a method 300 for simulated choral audio chatter in communication systems, according to embodiments of the present disclosure. The method 300 may begin at 302, in which audio data from each of a plurality of users participating in a first group of a plurality of groups for an event using a communication system may be received. The plurality of groups may be a plurality of breakout rooms, such as breakout rooms 202A, 202B, . . . 202N, and the event may be a conference having a main room, such as main room 270. In addition to receiving audio data one or more of video data, text data, gesture data, and transcription of the audio data from each of the plurality of users participating in the first group may be received. Before, concurrently, after, and/or continuously to 302, at 304, audio data from each of a plurality of users participating in a second group of the plurality of groups for the event using the communication system may be received. Each group of the plurality of groups may include a spatial location associated with the group. Before, concurrently, after, and/or continuously to 302 and/or 304, at 306, audio data from each of a plurality of users waiting in an admittance room for the event may be received.

Upon receiving the audio data, at 308, first simulated choral audio chatter based on the audio data received from each of the plurality of users in the first group may be generated. The generated first simulated choral audio chatter may remove recognizable speech of the audio data, and/or the generated first simulated choral audio chatter may be muffled and may preserve privacy of the speech of the audio data. Additionally, generating the first simulated choral audio chatter based on the audio data received from each of the plurality of users in the first group may also be based on the one or more of the video data, the text data, the gesture data, and the transcription of the audio data. Alternatively, to generating first simulated choral audio chatter directly based on the audio data received from each of the plurality of users in the first group, an activity level of the first group based on the audio data received from each of the plurality of users in the first group may be determined, and the first simulated choral audio chatter based on the determined activity level of the first group. Determining the activity level of the first group may be based on one or more of a pace, a tone, a volume, and a frequency of the audio data received from each of the plurality of users in the first group.

At 310, second simulated choral audio chatter based on the audio data received from each of the plurality of users in the second group may be generated. The generated second simulated choral audio chatter may remove recognizable speech of the audio data, and/or the generated second simulated choral audio chatter may be muffled and may preserve privacy of the speech of the audio data. The generated second simulated choral audio chatter may be produced in a similar manner as the generated first simulated choral audio chatter discussed above.

At 312, admittance simulated choral audio chatter based on the audio data received from each of the plurality of users in the admittance room may be generated. The generated admittance simulated choral audio chatter may remove recognizable speech of the audio data, and/or the generated admittance simulated choral audio chatter may be muffled and may preserve privacy of the speech of the audio data. The generated admittance simulated choral audio chatter may be produced in a similar manner as the generated first simulated choral audio chatter discussed above.

Additionally, and/or alternatively, a distance between each group from another group of the plurality of groups may be determined based on a spatial location of each group at 314. Then, at 316, generated simulated choral audio data for each group may be adjusted based on the determined distance between each group from another group. For example, as the determined distance increases, a volume of the generated simulated choral audio data may decrease. Alternatively, and overall gain, left/right channel gain, and/or directionality (left, center, right, up, down) may be adjusted based on the determined distance between each group from another group.

Additionally, and/or alternatively, the audio data of each group of the plurality of groups may be analyzed for at least one keyword or phrase at 318. Then, at 320, the at least one keyword or phrase may be determined whether it has occurred in the audio data of each group. Next, at 322, the spatial location of each group of the plurality of groups when the at least one keyword or phrase is determined to have occurred in the audio data of the group may be adjusted, such as for example, reduced.

Additionally, and/or alternatively, an activity level of the first group based on the audio data received from each of the plurality of users in the first group may be determined at 324. Then, at 326, the generated first simulated choral audio data for the first group may be adjusted based on the determined activity level of the first group. Additionally, the activity level may be determined further based on one or more of video data, text data, gesture data, and transcription of the audio data.

At 328, the generated first simulated choral audio data may be provided to at least one user of a plurality of users of the event. The at least one user may be one or more of an administrator of the event, a moderator of the event, an overseeing user of the event, and/or a presenter at the event. Optionally, generated simulated choral audio data may be provided to a particular group of the plurality of the groups when the determined distance for the particular group is less than a first predetermined threshold. Moreover, the actual audio data of the particular group may be provided when the determined distance is less than a second predetermined threshold, the second predetermined distance less than the first predetermined distance, and the generated simulated choral audio data may stop to be provided to the particular group when the determined distance is less than the second predetermined threshold. In such circumstances, one or more of an administrator of the event, a moderator of the event, an overseeing user of the event, and users of the particular group may be alerted when the actual audio data of the particular group is provided to another group of the plurality of groups.

Additionally, at step 330, the generated second simulated choral audio data may be provided to the plurality of users in the first group. The first generated simulated choral audio data provided to the at least one user of the plurality of users may include providing the first generated simulated choral audio data to the plurality of users in the second group. The generated admittance simulated choral audio data at 332 may be provided to the administrator of the event, the moderator of the event, and the overseeing user of the event. As mentioned above, the administrator of the event, the moderator of the event, and/or the overseeing user of the event may moderate the event from the main room 270 of the event and/or may moderate the event from one or more of the breakout rooms.

Finally, optionally, an amount of speech in each group may be determined based on the audio data received from each of the plurality of users in the respective group of the plurality of groups. Then, a signal may be generated and sent to one or more of the administrator of the event, the moderator of the event, the overseeing user of the event, the main room 270 of the event, and/or one or more of the breakout rooms 202A, 202B, . . . 202N when the determined amount of speech is below a predetermined threshold.

Detecting the use of simulated choral audio chatter may be done by moderating breakout rooms and detecting audio being received from the breakout room without the moderator entering the breakout room. Additionally, the detected audio without the moderator entering the breakout room may be compared to audio captured by a microphone of a user speaking in the breakout room to show that the audio chatter was generated by the user audio data in the breakout room.

Figure 4:
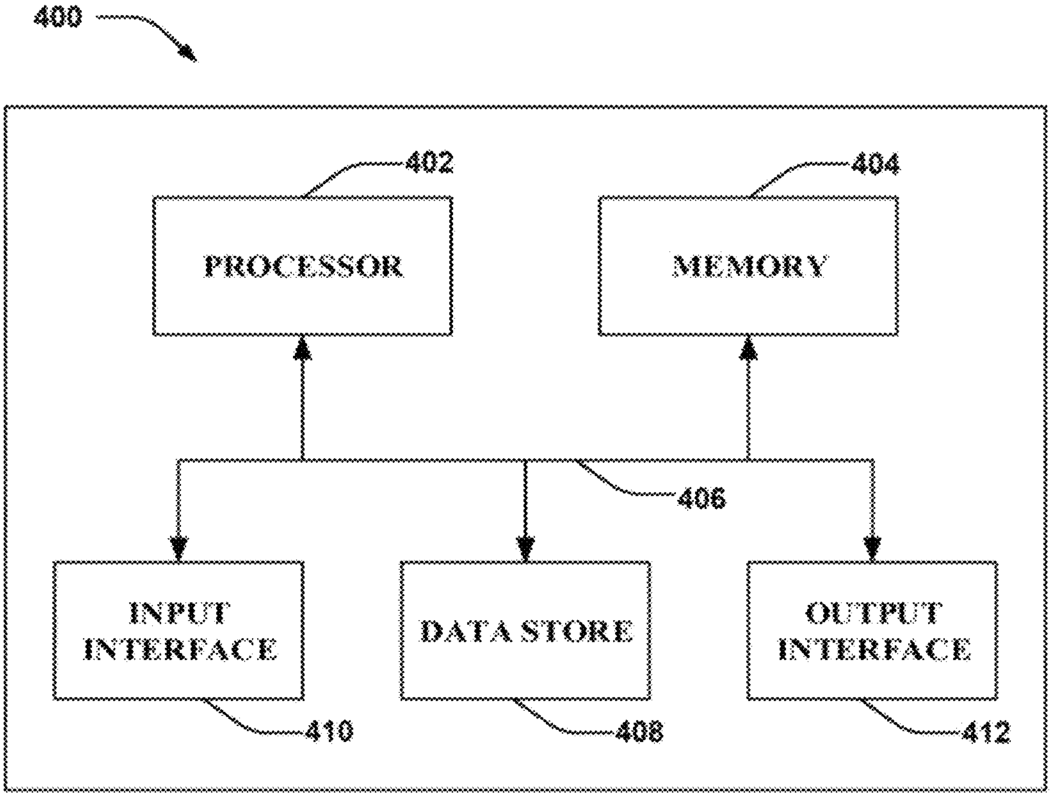
FIG. 4 depicts a high-level illustration of an exemplary computing device that may be used in accordance with the systems, methods, and computer-readable media disclosed herein, according to embodiments of the present disclosure.

FIG. 4 depicts a high-level illustration of an exemplary computing device 400 that may be used in accordance with the systems, methods, modules, and computer-readable media disclosed herein, according to embodiments of the present disclosure. For example, the computing device 400 may be used in a system that processes data, such as audio data, using a communication system, according to embodiments of the present disclosure. The computing device 400 may include at least one processor 402 that executes instructions that are stored in a memory 404. The instructions may be, for example, instructions for implementing functionality described as being carried out by one or more components discussed above or instructions for implementing one or more of the methods described above. The processor 402 may access the memory 404 by way of a system bus 406. In addition to storing executable instructions, the memory 404 may also store data, audio, and so forth.

The computing device 400 may additionally include a data store, also referred to as a database, 408 that is accessible by the processor 402 by way of the system bus 406. The data store 408 may include executable instructions, data, examples, features, etc. The computing device 400 may also include an input interface 410 that allows external devices to communicate with the computing device 400. For instance, the input interface 410 may be used to receive instructions from an external computer device, from a user, etc. The computing device 400 also may include an output interface 412 that interfaces the computing device 400 with one or more external devices. For example, the computing device 400 may display text, images, etc. by way of the output interface 412.

It is contemplated that the external devices that communicate with the computing device 400 via the input interface 410 and the output interface 412 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 400 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 400 may be a distributed system. Thus, for example, several devices may be in communication by way of a network connection and may collectively perform tasks described as being performed by the computing device 400.

Figure 5:
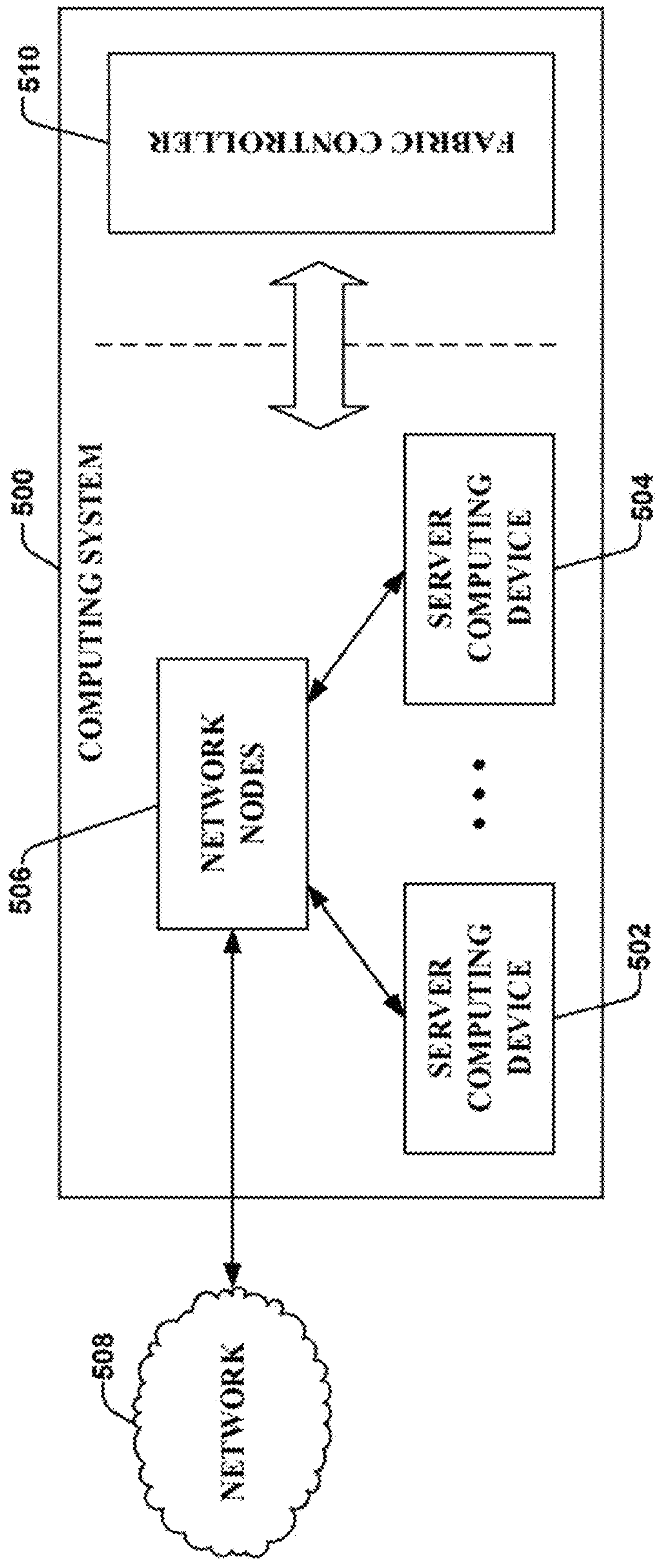
FIG. 5 depicts a high-level illustration of an exemplary computing system that may be used in accordance with the systems, methods, and computer-readable media disclosed herein, according to embodiments of the present disclosure.

Turning to FIG. 5, FIG. 5 depicts a high-level illustration of an exemplary computing system 500 that may be used in accordance with the systems, methods, modules, and computer-readable media disclosed herein, according to embodiments of the present disclosure. For example, the computing system 500 may be or may include the computing device 400. Additionally, and/or alternatively, the computing device 400 may be or may include the computing system 500.

The computing system 500 may include a plurality of server computing devices, such as a server computing device 502 and a server computing device 504 (collectively referred to as server computing devices 502-504). The server computing device 502 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 502, at least a subset of the server computing devices 502-504 other than the server computing device 502 each may respectively include at least one processor and a memory. Moreover, at least a subset of the server computing devices 502-504 may include respective data stores.

Processor(s) of one or more of the server computing devices 502-504 may be or may include the processor, such as processor 402. Further, a memory (or memories) of one or more of the server computing devices 502-504 can be or include the memory, such as memory 404. Moreover, a data store (or data stores) of one or more of the server computing devices 502-504 may be or may include the data store, such as data store 408.

The computing system 500 may further include various network nodes 506 that transport data between the server computing devices 502-504. Moreover, the network nodes 506 may transport data from the server computing devices 502-504 to external nodes (e.g., external to the computing system 500) by way of a network 508. The network nodes 502 may also transport data to the server computing devices 502-504 from the external nodes by way of the network 508. The network 508, for example, may be the Internet, a cellular network, or the like. The network nodes 506 may include switches, routers, load balancers, and so forth.

A fabric controller 510 of the computing system 500 may manage hardware resources of the server computing devices 502-504 (e.g., processors, memories, data stores, etc. of the server computing devices 502-504). The fabric controller 510 may further manage the network nodes 506. Moreover, the fabric controller 510 may manage creation, provisioning, de-provisioning, and supervising of managed runtime environments instantiated upon the server computing devices 502-504.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for simulated choral audio chatter in communication systems, the method comprising:

receiving audio data from each of a plurality of users participating in a first group of a plurality of groups for an event using a communication system;

receiving audio data from each of a plurality of users participating in a second group of the plurality of groups for the event, wherein each of the plurality of users participating in the first group are different from each of the plurality of users participating in the second group;

generating first simulated choral audio chatter based on speech of the audio data received from each of the plurality of users in the first group, wherein the generated first simulated choral audio chatter removes recognizable speech of the audio data and is audible;

concurrently to generating the first simulated choral audio chatter, generating second simulated choral audio chatter based on speech of the audio data received from each of the plurality of users in the second group, wherein the generated second simulated choral audio chatter removes recognizable speech of the audio data, is audible, and is different from the generated first simulated choral audio chatter;

providing the generated first simulated choral audio data to the plurality of users in the second group; and concurrently to providing the generated first simulated choral audio data to the plurality of users in the second group, providing the generated second simulated choral audio data to the plurality of users in the first group.

2. The method according to claim 1, wherein the plurality of groups are a plurality of breakout sessions and the event is a conference having a main session.

3. The method according to claim 1, wherein the at least one user is one or more of an administrator of the event, a moderator of the event, an overseeing user of the event, and a presenter at the event.

4. The method according to claim 3, further comprising: determining an amount of speech in each group based on the audio data received from each of the plurality of users in the respective group of the plurality of groups; and generating and sending a signal to one or more of the administrator of the event, the moderator of the event, and the overseeing user of the event when the determined amount of speech is below a predetermined threshold.

5. The method according to claim 3, further comprising: receiving audio data from each of a plurality of users waiting in an admittance room for the event;

generating admittance simulated choral audio data based on the audio data received from each of the plurality of users in the admittance room; and providing the generated admittance simulated choral audio data to the administrator of the event, the moderator of the event, and the overseeing user of the event.

6. The method according to claim 1, wherein each group of the plurality of groups includes a spatial location associated with the group, wherein the method further comprises:

determining a distance between each group from another group of the plurality of groups based on the spatial location of each group;

generating simulated choral audio data for each group from another group of the plurality of groups based on audio data of each respective group; and providing the generated simulated choral audio data to a particular group of the plurality of the groups when the determined distance for the particular group is less than a first predetermined threshold.

7. The method according to claim 6, further comprising: adjusting the generated simulated choral audio data for each group based on the determined distance between each group from another group, wherein as the determined distance increases, a volume of the generated simulated choral audio data decreases.

8. The method according to claim 6, further comprising: providing audio data of the particular group when the determined distance is less than a second predetermined threshold, the second predetermined threshold less than the first predetermined threshold; and ending providing of the generated simulated choral audio data to the particular group when the determined distance is less than the second predetermined threshold.

9. The method according to claim 8, further comprising: alerting one or more of an administrator of the event, a moderator of the event, an overseeing user of the event, and users of the particular group when audio data of the particular group is provided to another group of the plurality of groups.

10. The method according to claim 6, further comprising: analyzing the audio data of each group of the plurality of groups for at least one keyword or phrase;

determining whether the at least one keyword or phrase has occurred in the audio data of each group; and adjusting the spatial location of each group of the plurality of groups when the at least one keyword or phrase is determined to have occurred in the audio data of the group.

11. The method according to claim 1, further comprising: determining an activity level of the first group based on the audio data received from each of the plurality of users in the first group;

adjusting the generated first simulated choral audio data for the first group based on the determined activity level of the first group.

12. The method according to claim 11, wherein the activity level is further based on one or more of video data, text data, gesture data, and transcription of the audio data.

13. The method according to claim 1, wherein in the generated first simulated choral audio chatter is muffled and preserves privacy of the speech of the audio data.

14. The method according to claim 1, further comprising: receiving one or more of video data, text data, gesture data, and transcription of the audio data from each of the plurality of users participating in the first group;

wherein the generating of the first simulated choral audio chatter based on the speech of the audio data received from each of the plurality of users in the first group includes:

generating first simulated choral audio chatter based on the audio data received from each of the plurality of users in the first group and the one or more of the video data, the text data, the gesture data, and the transcription of the audio data.

15. The method according to claim 1, wherein the generated first simulated choral audio chatter based on the speech of the audio data received from each of the plurality of users in the first group includes:

determining an activity level of the first group based on the audio data received from each of the plurality of users in the first group; and generating first simulated choral audio chatter based on the activity level of the first group.

16. The method according to claim 15, wherein determining an activity level of the first group includes:

determining the activity level of the first group based on one or more of a pace, a tone, a volume, and a frequency of the audio data received from each of the plurality of users in the first group.

17. A system for simulated choral audio chatter in communication systems, the system including:

a data storage device that stores instructions for simulated choral audio chatter in communication systems; and a processor configured to execute the instructions to perform a method including:

receiving audio data from each of a plurality of users participating in a first group of a plurality of groups for an event using a communication system;

receiving audio data from each of a plurality of users participating in a second group of the plurality of groups for the event, wherein each of the plurality of users participating in the first group are different from each of the plurality of users participating in the second group;

generating first simulated choral audio chatter based on speech of the audio data received from each of the plurality of users in the first group, wherein the generated first simulated choral audio chatter removes recognizable speech of the audio data and is audible;

concurrently to generating the first simulated choral audio chatter, generating second simulated choral audio chatter based on speech of the audio data received from each of the plurality of users in the second group, wherein the generated second simulated choral audio chatter removes recognizable speech of the audio data, is audible, and is different from the generated first simulated choral audio chatter;

providing the generated first simulated choral audio data to the plurality of users in the second group; and concurrently to providing the generated first simulated choral audio data to the plurality of users in the second group, providing the generated second simulated choral audio data to the plurality of users in the first group.

18. A computer-readable storage device storing instructions that, when executed by a computer, cause the computer to perform a method for simulated choral audio chatter in communication systems, the method including:

receiving audio data from each of a plurality of users participating in a first group of a plurality of groups for an event using a communication system;

receiving audio data from each of a plurality of users participating in a second group of the plurality of groups for the event, wherein each of the plurality of users participating in the first group are different from each of the plurality of users participating in the second group;

generating first simulated choral audio chatter based on speech of the audio data received from each of the plurality of users in the first group, wherein the generated first simulated choral audio chatter removes recognizable speech of the audio data and is audible;

concurrently to generating the first simulated choral audio chatter, generating second simulated choral audio chatter based on speech of the audio data received from each of the plurality of users in the second group, wherein the generated second simulated choral audio chatter removes recognizable speech of the audio data, is audible, and is different from the generated first simulated choral audio chatter;

providing the generated first simulated choral audio data to the plurality of users in the second group; and concurrently to providing the generated first simulated choral audio data to the plurality of users in the second group, providing the generated second simulated choral audio data to the plurality of users in the first group.

19. The system according to claim 17, wherein in the generated first simulated choral audio chatter is muffled and preserves privacy of the speech of the audio data.

20. The computer-readable storage device according to claim 18, wherein in the generated first simulated choral audio chatter is muffled and preserves privacy of the speech of the audio data.

* * * * *